(12) United States Patent
Katraro et al.

(10) Patent No.: US 8,238,076 B2
(45) Date of Patent: Aug. 7, 2012

(54) BULK CAPACITOR AND METHOD

(75) Inventors: Reuven Katraro, Rishon Lezion (IL); Nissim Cohen, Tivon (IL); Marina Kravchik-Volfson, Haifa (IL); Eli Bershadsky, Haifa (IL); John Bultitude, Greenville, SC (US)

(73) Assignee: Vishay Sprague, Inc., Bennington, VT (US)

( * ) Notice: Subject to any disclaimer, the term of this patent is extended or adjusted under 35 U.S.C. 154(b) by 232 days.

(21) Appl. No.: 12/553,508

(22) Filed: Sep. 3, 2009

(65) Prior Publication Data

US 2010/0073846 A1   Mar. 25, 2010

Related U.S. Application Data

(60) Provisional application No. 61/094,317, filed on Sep. 4, 2008.

(51) Int. Cl.
*H01G 4/00* (2006.01)

(52) U.S. Cl. ............ 361/311; 361/525; 361/321.1; 361/309; 361/321.2; 361/508

(58) Field of Classification Search ............ 361/525, 361/508, 309, 321.1, 11, 321.2; 29/25.03
See application file for complete search history.

(56) References Cited

U.S. PATENT DOCUMENTS

| 3,585,460 | A | 6/1971 | Liederbach et al. | |
|---|---|---|---|---|
| 4,652,967 | A | 3/1987 | Sakabe et al. | |
| 6,219,223 | B1 | 4/2001 | Kobayashi et al. | |
| 6,344,966 | B1 * | 2/2002 | Monden et al. | 361/524 |
| 6,381,121 | B1 * | 4/2002 | Monden et al. | 361/525 |
| 6,456,483 | B1 | 9/2002 | Chiavarotti et al. | |
| 6,495,021 | B2 * | 12/2002 | Welsch et al. | 205/149 |
| 6,914,769 | B2 * | 7/2005 | Welsch et al. | 361/508 |
| 7,099,143 | B1 * | 8/2006 | Fife et al. | 361/516 |
| 2008/0232032 | A1 * | 9/2008 | Jones et al. | 361/509 |

FOREIGN PATENT DOCUMENTS

WO   2005-048277   5/2005

* cited by examiner

Primary Examiner — Nguyen T Ha
Assistant Examiner — Hung Dang
(74) Attorney, Agent, or Firm — Volpe and Koenig, P.C.

(57) ABSTRACT

A bulk capacitor includes a first electrode formed of a metal foil and a semi-conductive porous ceramic body formed on the metal foil. A dielectric layer is formed on the porous ceramic body for example by oxidation. A conductive medium is deposited on the porous ceramic body filling the pores of the porous ceramic body and forming a second electrode. The capacitor can then be encapsulated with various layers and can include conventional electrical terminations. A method of manufacturing a bulk capacitor includes forming a conductive porous ceramic body on a first electrode formed of a metal foil, oxidizing to form a dielectric layer and filling the porous body with a conductive medium to form a second electrode. A thin semi-conductive ceramic layer can also be disposed between the metal foil and the porous ceramic body.

21 Claims, 3 Drawing Sheets

BULK CAPACITOR AND METHOD

CROSS REFERENCE TO RELATED APPLICATION(S)

This application claims the benefit of U.S. Provisional Patent Application Ser. No. 61/094,317 filed Sep. 4, 2008 which is incorporated by reference as if fully set forth.

FIELD OF THE INVENTION

The present invention relates to capacitors. More particularly, the present invention relates to a capacitor which is capable of achieving a high capacitance density.

BACKGROUND

Technologies for producing capacitors (including electrolytic capacitors and ceramic capacitors) are being pushed to their practical physical limit. Traditionally, high capacitance density is achieved either by high surface area such as in tantalum electrolytic capacitors or carbon double layer capacitors. Alternatively, high capacitance density may be achieved by thin high dielectric constant (K) dielectric materials such as used in multi-layer ceramic capacitors. Despite these advances, problems remain. In particular, the demand for high capacitance density is ever increasing beyond limits associated with such methodologies. High capacitance density is a highly desirable feature for making smaller electronic devices.

What is needed is a capacitor which allows a high capacitance density to be achieved. It is therefore an object, feature, or advantage of the embodiments disclosed herein to provide a capacitor and a method of manufacturing a capacitor which allows a high capacitance density to be achieved.

One or more of these aspects will become apparent from the specification and claims that follow.

SUMMARY

According to one aspect of the embodiments disclosed herein, a bulk capacitor includes a metal foil, a semi-conductive porous ceramic body on the metal foil, a dielectric layer on the porous ceramic body (e.g., formed by oxidation), a conductive medium filling the porous body, and a conductive metal layer encapsulating the porous body. According to another aspect of the present invention, a method of manufacturing a bulk capacitor includes forming a semi-conductive porous ceramic body on a metal foil, oxidizing the semi-conductive porous ceramic body to form a dielectric layer, filling the porous body with a conductive medium, and encapsulating the porous body with a conductive metal layer.

DETAILED DESCRIPTION OF THE PREFERRED EMBODIMENTS

The present invention provides a capacitor with a high capacitance density. The present invention achieves a high capacitance density through an innovative combination of high dielectric constant of ceramics and the high surface area of a porous matrix. In particular, a capacitor may utilize the high dielectric constant of ceramic materials in combination with a porous ceramic body having a high surface area.

A porous ceramic body is formed on a metal foil. In general, the metal foil serves as the first electrode. An intermediate ceramic layer may also be disposed between the porous ceramic body and the medal foil. The porous ceramic body is subsequently oxidized. The oxidation can be formed by various techniques such as thermal or electrochemical oxidation. The oxidation forms a thin high K dielectric layer on the free surface of the porous ceramic body. The porous ceramic body is then filled with a conductive medium such as, for example, a conductive polymer. In general, the conductive medium forms a second electrode. Subsequent structure can then be added to encapsulate the capacitor structure and form suitable mounting structures and/or electrical terminations. For example, after the porous ceramic body is filled with the conductive medium, it can be encapsulated with a conductive metal layer such as, for example, silver.

The resulting combination of high surface area as provided by the porous structure and the high K dielectric thin layer provided by the dielectric allows for the making of small-size, high capacitance density capacitors.

Figure 1:
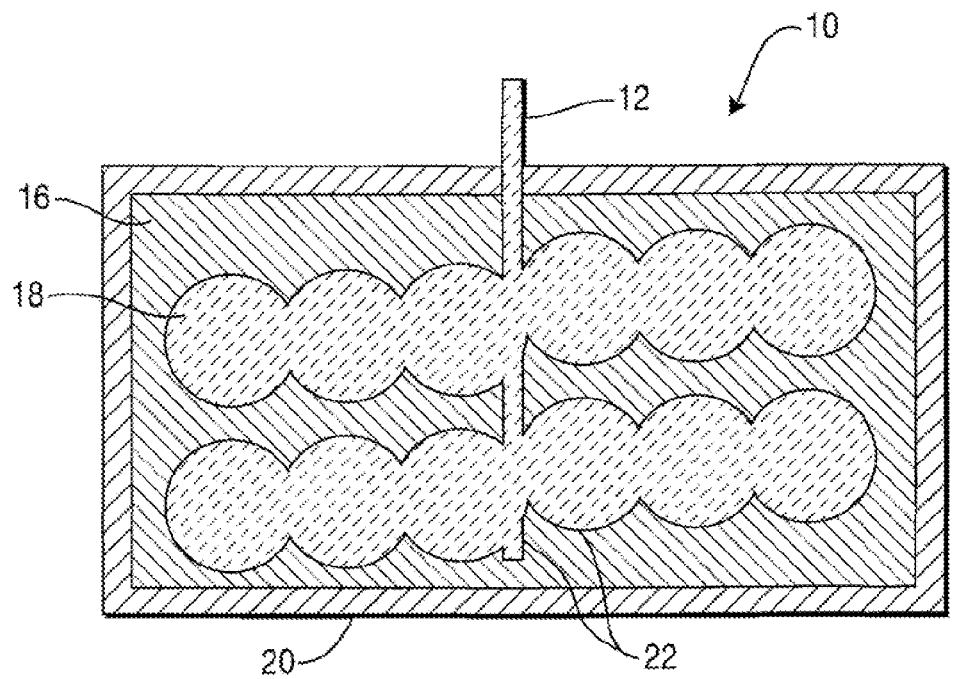
FIG. 1 illustrates one embodiment of a capacitor in accordance with the present invention.

FIG. 1 illustrates a simplified embodiment of a capacitor 10. The capacitor 10 includes a first electrode 12 which may be formed of a variety of materials including a metal foil. A variety of metal foils can be used. The metal foil may be taken from the group of elements including: Ta, Ni, W, Nb, V, Mo, Fe or their alloys. Kovar and Invar alloys are also preferred since their coefficient of thermal expansion (CTE) matches the CTE of the dielectric layer and/or ceramic layer(s). Suitable foils are available from a variety of sources including but not limited to: Carpenter Technology Corporation of Wyomissing, Pa., Cabot Supermetals Inc. of Boyertown, Pa., and HC Starck Inc. of Newton, Mass. As noted above, the first electrode 12 has a CTE selected to match the dielectric and/or ceramic element and thereby minimize thermal stress. In a typical embodiment, a CTE of 3-15 ppm is utilized. A variety of foil thicknesses can be used for example the 20-250 micron range. A more typical range may be in the 100-150 micron range.

A semi-conductive porous ceramic body 18 is formed on the first electrode 12. It is understood that a variety of geometric profiles (primarily dependent on the shape of first electrode 12) can be utilized without departing from the scope of the invention. It is also understood that the porous ceramic body may be formed and/or deposited using a variety of processes with a variety of ceramic layers and/or compositions. In one embodiment, a thin conductive semi-conductive ceramic layer can be deposited on the first electrode 12 prior to depositing the conductive porous ceramic body 18. A variety of semi-conductive ceramic materials can be used including barium, strontium titanate (BST). Other suitable chemical compositions including elements like $Nb_2O_5$, $TiO2$, $BaCO_3$ and $SrTiO3$ can also be used. Still other suitable materials can include lead magnesium nionbate (i.e., $Pb_3MgNb_2O_9$), lead titante, and perovskite oxides.

Figure 2:
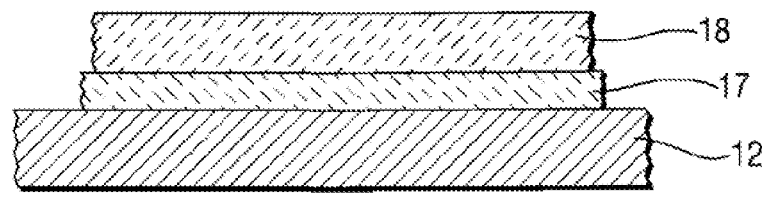
FIG. 2 is sectional view showing a portion of a first electrode, a first ceramic layer and a porous ceramic body according to one aspect of the present invention.

FIG. 2 shows a simplified sectional view of an embodiment having a first electrode 12, a semi-conductive first ceramic layer 17 and a semi-conductive porous ceramic body 18. It is understood that the thicknesses are not shown to scale. The first ceramic layer 17 is relatively thin and is deposited on the first electrode 12 with a thickness between 1-10 microns. The first ceramic layer 17 is typically sintered to full density under reducing atmosphere. The reducing atmosphere can be selected from a variety of gases. For example, the reducing atmosphere may be selected from: Ar and $H_2$ gas with the hydrogen concentration typically between 1-10%. Other gases like $N_2/H_2$ can be used. The reduction temperature is typically between 900-1400 degrees C. The typical time duration at peak temperature is typically 5-60 minutes. It is understood that a variety of temperature profiles can be utilized. The first ceramic layer 17 preferably has a conductivity that is higher (i.e., more conductive) than 5 ohm-cm after the reducing sintering treatment.

The porous ceramic body 18 is deposited as a second ceramic layer onto the first ceramic layer 17. It is also understood that the porous ceramic body 18 can be deposited directly on the first electrode 12. Both the first ceramic layer 17 and the porous ceramic body 18 can be deposited using conventional ceramic deposition techniques such as screen printing, doctor blade, lamination, spraying or dip coating. In the current example, the first ceramic layer 17 and the porous ceramic body 18 are deposited using Electrophoretic Deposition (EPD).

Since the first ceramic layer 17 is semi-conductive after the reduction sintering, a second layer (e.g., forming porous ceramic body 18) can be deposited using EPD techniques. In general, EPD uses electrically charged particles that are deposited on a counter electrode under the influence of an electric field. EPD can deposit wide range of particulate materials, almost without dependency on their chemical composition. EPD can form free standing bodies and layers. The layers can be from micron range thick to a few mm in thickness. The solid loading of the powder in the suspension, electric field intensity and time are the main parameters to control weight of deposition in an EPD process.

The porous ceramic body 18 is constructed from high surface area e.g., BET (Brunauer, Emmett, Teller) of 0.5-5 m2/g powders. The porous ceramic body 18 is typically sintered under reducing atmosphere such as the reducing atmosphere disclosed above in connection with the first ceramic layer. A variety of reduction temperatures can be utilized. The reduction temperature is typically selected to maintain the open pore structure and avoid massive densification. The thickness of the porous ceramic body 18 after reduction is typically in the 10-250 micron range.

The resulting ceramic body has an open pore structure with porosity up to 75% of volume. The pore structure can include a wide range of pore sizes from 0.1-6 microns. Preferably pore sizes are in the 0.3-3 micron range. The porous ceramic body 18 can have a variety of geometries that will typically depend on the shape of the first electrode 12. For example, the first electrode 12 can be rectangular having a thickness of approximately 100 microns. The porous ceramic body 18 can be deposited on the first electrode 12 from multiple angles (e.g., from two sides). The first electrode can have other geometric profiles such as comb shapes, and/or simple or complex shapes including one or more polygons.

Returning to FIG. 1, dielectric layer 22 is formed on the porous ceramic body 18 (and first ceramic layer 17 if present). It is noted that reference numbers 22 and 18 as shown in the drawings point to the same structure. This is due to the difficulties in illustrating the various thin layers in the drawings. It is understood that the dielectric layer 17 generally overlies the free surface area of the porous ceramic body 18. The resulting shape of the porous ceramic body remains essentially unchanged after deposition of the dielectric layer (except for a very small increase in thickness). The dielectric layer 22 can be formed via a variety of processes including thermal or electrochemical oxidation. In an embodiment using thermal oxidation the porous ceramic body 18 is heated in an oxygen containing atmosphere to temperatures between 500-1400 deg C. for periods of 5-120 minutes. This leads to the formation of a thin dielectric layer on the semi-conductive porous ceramic body 18 (and first ceramic layer 17 if present). Pump and purge cycles can be used during the treatment and/or at peak temperature to insure oxygen presence within the pores of the porous ceramic body 18.

In an embodiment using electrochemical oxidation, the porous ceramic body 18 (and first ceramic layer 17 if present) is inserted in one or more high base solutions, alkaline, (pH>10). This leads to the formation of a dielectric layer. For example, the solution can be ammonium based, St, BaOH2 (Barium, strontium Hydroxide) optionally in combination with Br, St $8(OH)_2$. The porous ceramic body 18 is dipped into a solution that is typically heated to temperatures between 40-130 degrees C. An anodizing electric field is typically applied causing a dissolution-reduction to occur at the free surface of porous ceramic body 18. Typical apply voltages are between 2-20V, for a period of 1-12 hrs. Once the dielectric layer is formed, a post treatment can be utilized to stabilize the dielectric layer 22 (e.g., heating to 250-1200 deg C. in an oxygen atmosphere).

The properties of the dielectric layer can be further modified by dissolving elements such as Mn, Nb, Mg, Si, Zr, Ti, Bi, Cu, Ag in the solution. These elements participate in the electrochemically formatted oxidized layer. Post treatment to 1200 degrees C. can also be applied. For example, a highly stable dielectric layer of manganese layer ($Mn_xO_y$, $x>2$, $y>3$) can be formed by oxidation and post heating treatment. The dielectric layer 22 (whether formed by thermal or electrochemical oxidation or other processes) is typically formed with a thickness in the 0.1-1 micron range and has a high insulation resistance (IR) typically in the $10^6$-$10^{11}$ ohm range. Once oxidized, the porous ceramic body 18 (and first ceramic layer 17 if present) is typically characterized by high dielectric constant (K) in the 500-50000 range.

A conductive medium 16 is used to fill the porous ceramic body 18. Various compositions can be used as a conductive medium including conductive polymers: PEDT (poly(3,4-ethylenedioxythiophene), poly(acetylene)s, poly(pyrrole)s, poly(thiophene)s, polyanilines, polythiophenes, poly(p-phenylene sulfide), and poly(para-phenylene vinylene)s (PPV) and its soluble derivatives, poly(3-alkylthiophenes), polyindole, polypyrene, polycarbazole, polyazulene, polyazepine, poly(fluorene)s, and polynaphthalene.

In one embodiment, a commercially available PEDT composition is utilized (Clevios (PEDT) available from HC Starck Inc. of Newton, Mass.). In general the conductive medium should have a conductivity greater than 100 siemens/cm and preferably equal or higher than 1000 s/cm. The conductive medium can be applied by a variety of processes including dip coating impregnation. In general the porous ceramic body 18 is impregnated with a diluted mixture containing fine dispersed particles of the conductive medium (e.g., nano-sized).

In general, the conductive medium 16 forms second electrode. Subsequent structure can then be added to encapsulate the capacitor structure and form suitable mounting structures and/or electrical terminations. In this example, a conductive metal layer 20 encapsulates the porous ceramic body 18 (now coated with a dielectric layer 22 and a conductive medium 16) and functions as an electrical termination for the second electrode. A variety of metals can be used. In one embodiment a highly conductive silver paste is used. The metal layer can be can be applied by a variety of techniques including brushing or dipping. Suitable metals are commercially available from a variety of sources including Lord Corporation of Cary, N.C., Emerson and Cumming of Irvine Calif., and Du-Pont.

Figure 3:
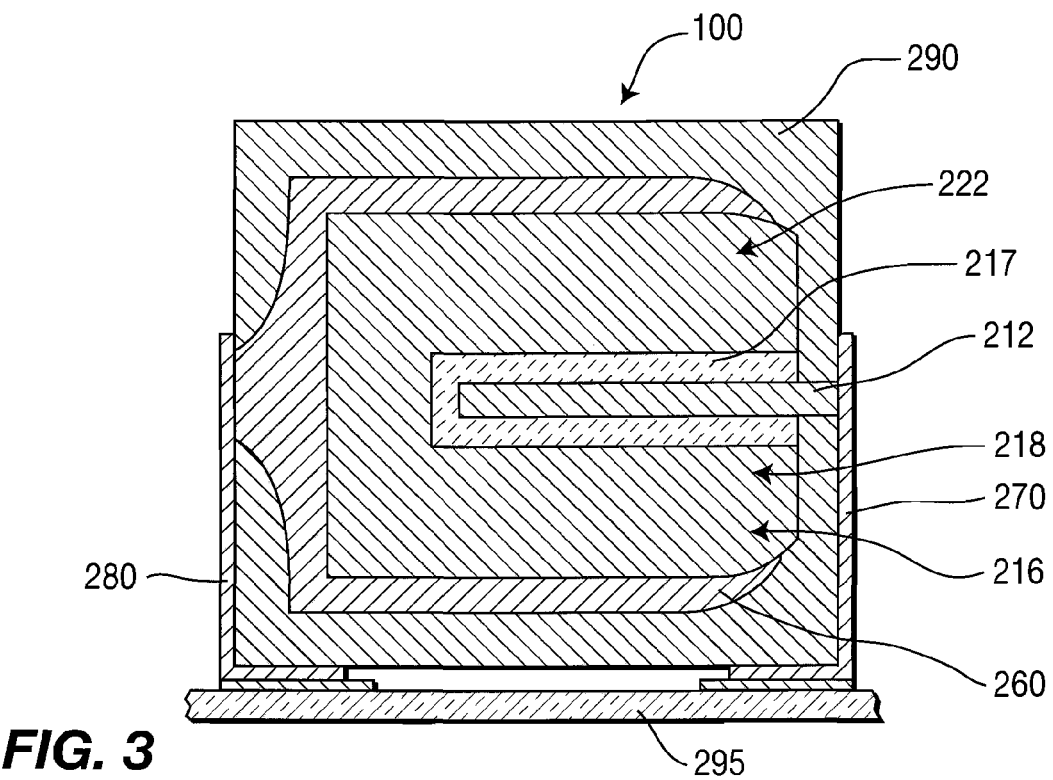
FIG. 3 illustrates another embodiment of a capacitor in accordance with the present invention.

FIG. 3 shows another embodiment in accordance with the invention. The individual layers shown in FIG. 3 can be formed using the materials and processes discussed above in connection with FIG. 1. In this embodiment, the capacitor 100 has a first electrode 212 comprising in this example a metal foil. A first ceramic layer 217 is disposed on the metal foil 212. A porous ceramic body 218 is formed on the first ceramic layer 217. It is understood that the porous ceramic body 218 can be directly formed on the first electrode 212. A dielectric layer 222 is formed on the porous ceramic body 218. A conductive medium 216 encapsulates the porous ceramic body 218. The conductive medium 216 essentially forms a second electrode. Suitable conductive medium can include the conductive polymers discussed above in connection with FIG. 1.

It is noted that reference numbers 222, 218 and 216 as shown in the drawings point to the same structure. This is due to the difficulties in illustrating the various thin layers in the drawings. It is understood that the dielectric layer 222 generally overlies the free surface area of the porous ceramic body 218. The resulting shape of the porous ceramic body remains essentially unchanged after deposition of the dielectric layer (except for a very small increase in thickness). The conductive medium 216 then encapsulates the porous ceramic body yielding the generally rectangular shape shown in FIG. 3.

The remaining structure is primarily directed towards forming electrical terminations and encapsulating the resulting structure. In this example, at least a portion of the conductive polymer layer is covered in a highly conductive silver paste layer 260. A first electrical lead 270 is electrically coupled to the first electrode 212 and a second electrical lead 280 is coupled to the silver paste layer 260. The structure is also encapsulated by layer 290 which can comprise a variety of materials such as epoxy, resin, parylene or a variety of known molding techniques. The entire capacitor assembly can be attached to a mounting substrate 295 as discussed in more detail below.

Figure 4:
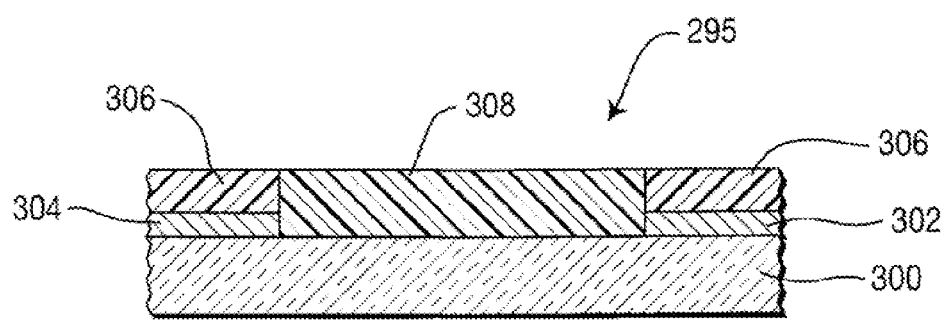
FIG. 4 illustrates a mounting substrate in accordance with the present invention.

FIG. 4 shows a detailed view of a mounting substrate 295 such as a typical printed circuit (PC) board. The mounting substrate includes a base portion 300 which can be fabricated using conventional PC board technologies. A first and second metallization 302, 304 are formed on the substrate 300. The first and second metallization 302, 304 are generally spaced apart so as to align with the first and second electrical leads 270, 280 as shown in FIG. 3. It is understood that first and second metallizations can be coupled to one or more circuit traces (not shown). Conductive glue 306 is used to electrically couple the first and electrical leads 270, 280 to the first and second metallization 302, 304. A non-conductive glue 308 can be used in the area disposed between the first and second metallizations 302, 304. Once the capacitor 100 is mounted, to the substrate a soldering operation can follow using conventional techniques. It is understood that a wide variety of mounting techniques can be used without departing from the scope of the invention.

Figure 5:
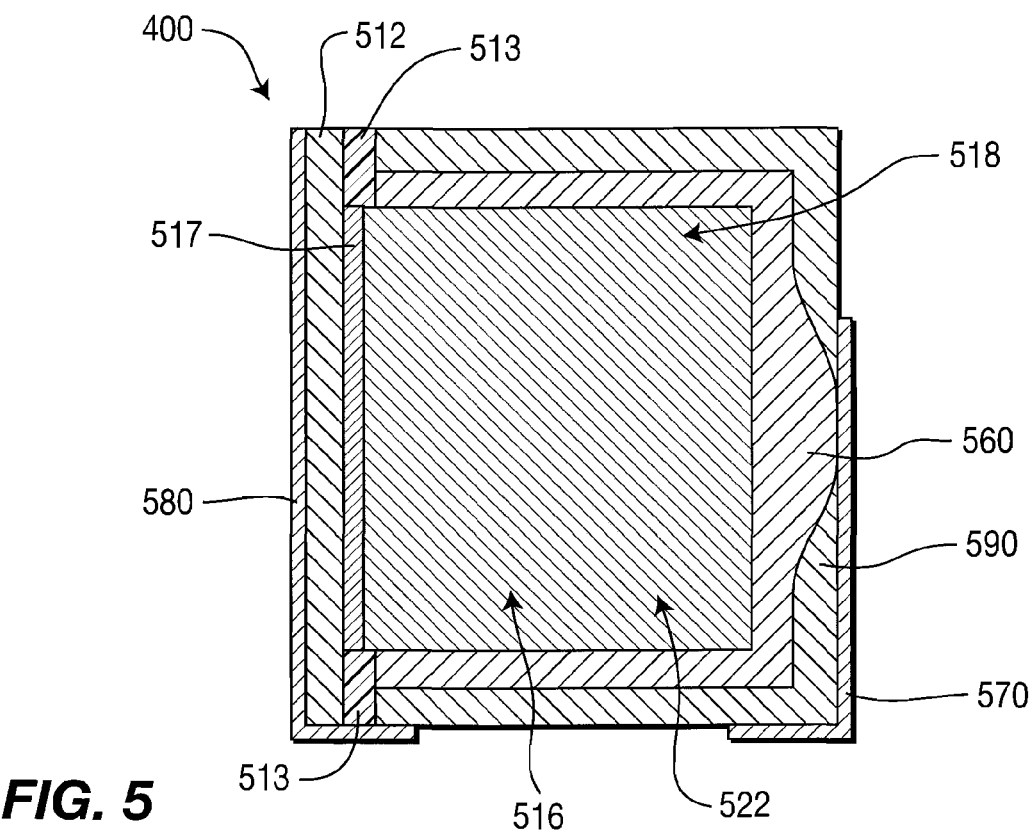
FIG. 5 illustrates another embodiment of a capacitor in accordance with the present invention.

FIG. 5 shows another embodiment in accordance with the invention. In this embodiment, the first electrode 512 is disposed along the edge of the structure as opposed to the centrally disposed first electrode 212 disclosed in FIG. 4. The individual layers shown in FIG. 5 can be formed using the materials and processes discussed above in connection with FIG. 1. In this embodiment, the capacitor 400 has a first electrode 512. A first ceramic layer 517 is disposed on the metal foil 512. A porous ceramic body 518 is formed on the first ceramic layer 517. It is understood that the porous ceramic body 518 can be directly formed on the first electrode 512.

A dielectric layer 522 is formed on the free surface of the porous ceramic body 518. A conductive medium 516 (e.g., conductive polymer) is impregnated into the pores of the porous body 518.

It is noted that reference numbers 522, 518 and 516 as shown in the drawings point to the same structure. This is due to the difficulties in illustrating the various thin layers in the drawings. It is understood that the dielectric layer 522 generally overlies the free surface area of the porous ceramic body 518. The resulting shape of the porous ceramic body remains essentially unchanged after deposition of the dielectric layer (except for a very small increase in thickness). The conductive medium 522 then encapsulates the porous ceramic body yielding the generally rectangular shape shown in FIG. 5.

The typical thickness of layer 516 is 1-10 microns. Full impregnation of all open pores in the porous ceramic body 518 is preferred as this provides maximum capacitance. The conductive polymer preferably has good adhesion to the dielectric layer 522 to insure good electrical performance. An insulating layer 513 is disposed between the first electrode and the remaining layers that are coupled to the second electrode to provide electrical insulation between the two electrodes. A wide variety of insulating materials can be used for this purpose.

The remaining structure is primarily directed towards forming electrical terminations for the second electrode and encapsulating the resulting structure. A conductive metal paste layer 560 (e.g., silver paste) is applied to a portion of the conductive medium 516. A first electrical lead 570 is electrically coupled to the first electrode 512 and a second electrical lead 580 is coupled to the conductive metal paste layer 560. The structure is also encapsulated by layer 590 which can comprise a variety of materials such as epoxy, resin, parylene applied by one of a variety of known techniques. It is understood that a variety of electrical terminations and encapsulation techniques can be utilized without departing from the scope of the invention. It is also understood that additional layers could be added to the structure without departing from the scope of the invention.

Figure 6:
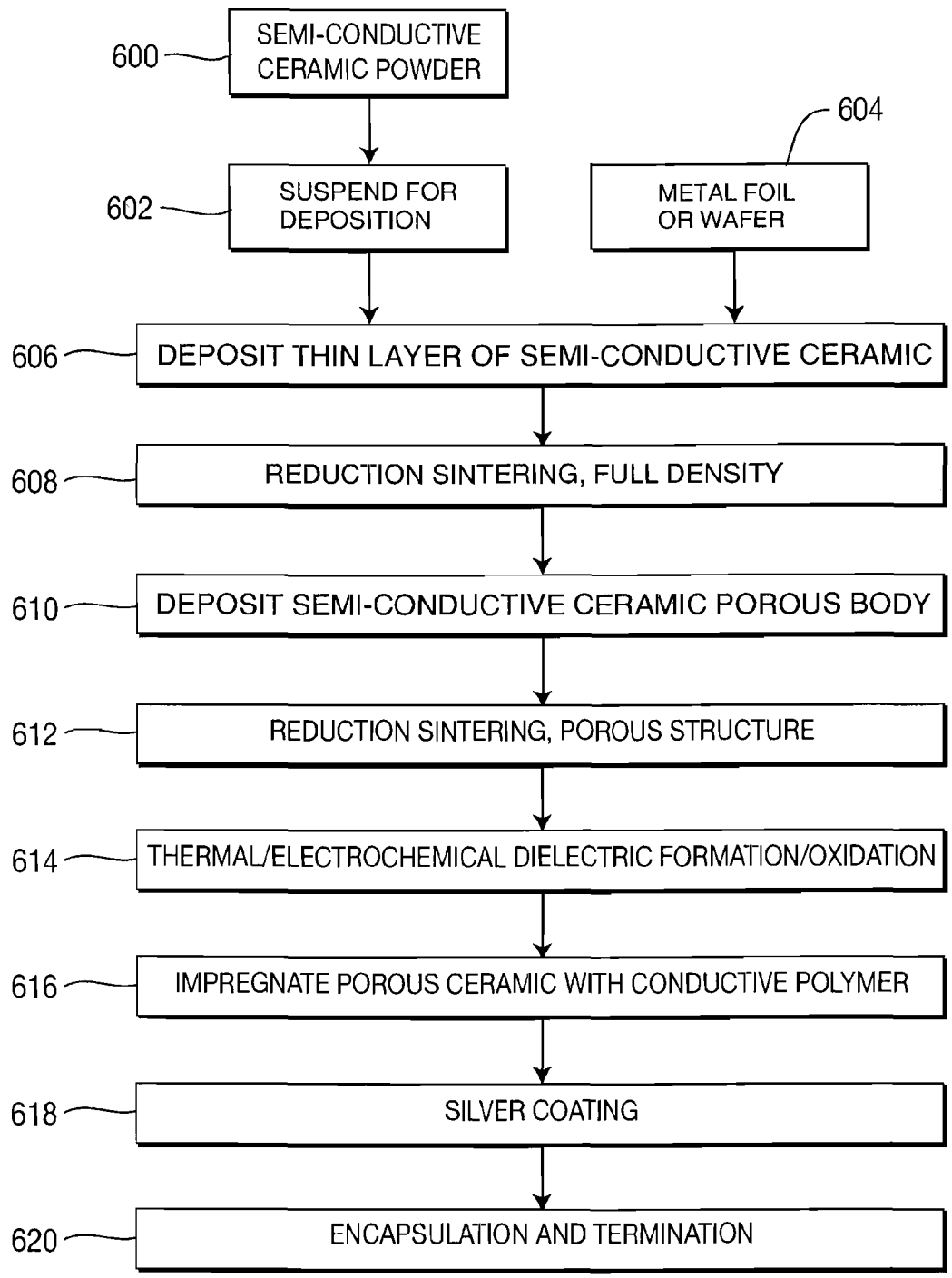
FIG. 6 illustrates a methodology according to one aspect of the present invention.

FIG. 6 illustrates one embodiment of a method of manufacturing a bulk capacitor of the present invention. The various process steps set forth in FIG. 6 are carried as discussed generally above. In step 600 a suitable ceramic material is prepared. The ceramic particles are then placed in a suitable suspension for deposition (e.g., by EPD) as shown by block 602. The first electrode (e.g., Kovar foil) is shaped into the desired geometric shape using conventional methods as shown by block 604.

A first (thin) ceramic layer is then deposited on the first electrode as shown by block 606. The first ceramic layer is then sintered to full density under a reducing atmosphere (e.g., $Ar/H_2$) as shown by block 608. The reduction temperature is typically between 900-1400 degrees C. The typical time duration at peak temperature is typically 5-60 minutes. Next a porous ceramic body is deposited on the first ceramic layer as shown by block 610. The porous ceramic body is then sintered in reducing atmosphere as shown by block 612 and as discussed generally above. A variety of reduction temperatures can be utilized. The reduction temperature is typically selected to maintain the open pore structure and avoid massive densification.

The porous ceramic body is then oxidized to form a thin dielectric layer as shown by block 614. For example, the porous ceramic body can be is heated in an oxygen containing atmosphere to temperatures of 900 deg C. for approximately 5-120 minutes. This leads to the formation of a dielectric layer. Pump and purge cycles can be used during the process to insure oxygen presence within the pores of the porous ceramic body.

The porous ceramic body (now covered in a thin dielectric layer) is then impregnated with a conductive medium (e.g., a conductive polymer as discussed above) as shown by block 616. In this example, at least a portion of the porous ceramic body is then coated with a suitable silver compound (e.g., silver paste) as shown by block 618. Electrical leads forming the anode and cathode are attached and the package is encapsulated as shown by block 620.

A bulk capacitor and methods of manufacturing the bulk capacitor have been disclosed. That which has been disclosed is merely exemplary. The present invention contemplates numerous variations, options, and alternatives fall within the spirit and scope of the claimed invention. Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. It is intended in the appended claims to cover all those changes and modifications which fall within the true spirit and scope of the present invention.

What is claimed is:

1. A bulk capacitor, comprising:
    a first electrode formed of a metal foil,
    a semi-conductive porous ceramic body deposited on the metal foil,
    a dielectric layer formed on the porous ceramic body,
    a semi-conductor ceramic layer disposed between the metal foil and the porous ceramic body, and
    a conductive medium filling at least a portion of porous ceramic body forming a second electrode.

2. The bulk capacitor of claim 1 further comprising a conductive metal layer encapsulating the porous ceramic body.

3. The bulk capacitor of claim 2 wherein the conductive metal layer comprises silver.

4. The bulk capacitor of claim 1 wherein the metal foil has a geometric profile.

5. The bulk capacitor of claim 1 wherein the conductive medium comprises a conductive polymer.

6. The bulk capacitor of claim 1 wherein the dielectric layer is formed on a free surface of the porous ceramic body.

7. The bulk capacitor of claim 1 wherein the dielectric layer is formed on porous ceramic body and on the metal foil.

8. A bulk capacitor, comprising:
    a first electrode formed of a metal foil,
    a semi-conductive porous ceramic body deposited on the metal foil, a dielectric layer formed on the porous ceramic body,
    a conductive medium filling at least a portion of porous ceramic body forming a second electrode, and
    a first electrical lead coupled to the first electrode and a second electrical lead coupled to the second electrode, wherein the first electrical lead and second electrical lead are configured to mate with first and second conductive pads located on a mounting substrate.

9. The bulk capacitor of claim 8 wherein the first and second electrode are joined to the first and second conductive pads via a conductive adhesive.

10. The bulk capacitor of claim 9 further comprising a non-conductive adhesive disposed between the first and second electrical leads.

11. A method of manufacturing a bulk capacitor, the method comprising:
    forming a conductive porous ceramic body on a first electrode comprising a metal foil,
    oxidizing the porous ceramic body to form a dielectric layer,
    forming a semi-conductive ceramic layer between the metal foil and the porous ceramic body, and
    filling the porous ceramic body with a conductive medium forming a second electrode.

12. The method of claim 11 comprising encapsulating the porous ceramic body with a conductive metal layer.

13. The method of claim 12 wherein the conductive metal layer comprises silver.

14. The method of claim 11 comprising forming a geometric profile in the metal foil.

15. The method of claim 11 wherein the oxidizing is performed thermally.

16. The method of claim 11 wherein the oxidizing is performed electrochemically.

17. The method of claim 11 wherein the conductive medium comprises a conductive polymer.

18. The method of claim 11 wherein the dielectric layer is formed on porous ceramic body and on the metal foil.

19. A method of manufacturing a bulk capacitor, the method comprising:
    forming a conductive porous ceramic body on a first electrode comprising a metal foil,
    oxidizing the porous ceramic body to form a dielectric layer, and
    filling the porous ceramic body with a conductive medium forming a second electrode,
    wherein a first electrical lead is coupled to the first electrode and a second electrical lead is coupled to the second electrode, wherein the first electrical lead and second electrical lead are configured to mate with first and second conductive pads located on a mounting substrate.

20. The method of claim 19 wherein the first and second electrode are joined to the first and second conductive pads via a conductive adhesive.

21. The method of claim 20 wherein a non-conductive adhesive is disposed between the first and second electrical leads.

* * * * *